United States Patent [19]

Gomez

[11] Patent Number: 4,800,963
[45] Date of Patent: Jan. 31, 1989

[54] BIDIRECTIONAL MOLDBOARD PLOW WITH MOLDBOARD FRAME INCLUDING GUIDE MEMBER

[75] Inventor: Pompeyo B. Gomez, Monterrey, Mexico

[73] Assignee: Industrias John Deere, S.A. de C.V., Nuevo Leon, Mexico

[21] Appl. No.: 36,430

[22] Filed: Apr. 9, 1987

[30] Foreign Application Priority Data

Apr. 9, 1986 [MX] Mexico ................... 2115

[51] Int. Cl.$^4$ ............................................. A01B 3/40
[52] U.S. Cl. ........................................................ 172/219
[58] Field of Search .............. 172/218, 219, 220, 221, 172/222, 223

[56] References Cited

U.S. PATENT DOCUMENTS

| 352,849 | 11/1886 | Ball | 172/219 |
| 375,802 | 1/1888 | Clark | 172/218 |
| 2,764,075 | 9/1956 | Fowler | 172/219 X |
| 3,042,120 | 7/1962 | Heckathora et al. | 172/222 X |
| 3,101,789 | 8/1963 | Jennings | 172/219 |

FOREIGN PATENT DOCUMENTS

| 643998 | 8/1962 | Italy | 172/219 |
| 640688 | 1/1979 | U.S.S.R. | 172/219 |
| 812199 | 3/1981 | U.S.S.R. | 172/219 |

Primary Examiner—Richard T. Stouffer
Attorney, Agent, or Firm—Oblon, Fisher, Spivak, McClelland & Maier

[57] ABSTRACT

A moldboard plow with a bidirectional moldboard which includes a moldboard frame that can turn by use of a reversal mechanism which also serves as a tilting mechanism. Included is a hitching frame that has a central pole and hitching plates, a moldboard frame having a guide member extending along the longitudinal axis thereof, a set of bidirectional moldboards fastened to the hitching frame by a pivot pin for reversal of the plow so that the bidirectional moldboards cut into the soil on a right and left side of the plow, and a reversing mechanism connected to the guide member of the moldboard frame for moving the moldboard frame and the set of bidirectional moldboards to the right side and left side of the plow.

3 Claims, 2 Drawing Sheets

4,800,963

BIDIRECTIONAL MOLDBOARD PLOW WITH MOLDBOARD FRAME INCLUDING GUIDE MEMBER

BACKGROUND OF THE INVENTION

To break up the soil, moldboard and rotary disk plows are already known and now used. Moldboard plows are widely used in countries with highly developed agriculture. In our country, they have not been used extensively, disk plows being more popular and now used by the majority of farmers. On both types of plows are devices to make the tractor go back and forth and the plow to turn the earth in the same direction.

Disk plows are made up of a series of rotary concave disks mounted individually and supported by a frame; their penetrating effect into the earth occurs mainly from weight although it is also affected by the vertical and horizontal position of the disk.

The width of the cut made by the disk is affected by the size of the disk, since if it is spaced too widely it leaves an area of earth without turning it over by its parabolic cut.

Since the disks are rotary, they allow a bidirectional operation solely by reversing the direction the disk faces.

To compensate for the lateral force of the disk and to control the depth, these plows require a rear wheel.

Of course, the disadvantage of fixed disk plows is that the farmer must plow the field by making turns from the edges to the center of the field, while moldboard plows allow the earth to be worked parallel back and forth, creating equal furrows without leaving free spaces.

Now, moldboard plows for their part can have a single set of moldboards that can turn the earth only in one direction and it is necessary to work in strips or series of parallel furrows, leaving the surface uneven.

There are designs of moldboards for different speeds, widths of cut and types of soil. The bodies of the moldboards occasionally require a disconnecting device for uneven ground with stumps, rocks or hard strips. Each moldboard requires a wear plate or heel to compensate for the lateral force and to control the depth.

The moldboards of present plows are fastened to supports and the latter in turn are fastened to the main frame. Their effect of penetration into the soil is achieved by suction when pulled by the tractor, not having limitations of cutting width and they do not leave the earth without turning it over, since their cut is straight.

There are also plows with two sets of left and right moldboards which permit a reversible action, since the tractor can reverse direction and, despite this, the earth can be turned on the same side, which makes it possible to start the work at one end of the land and end at the other, resulting in a better leveled surface However, the disadvantage of the reversible plows with two sets of moldboards is that the stability of the tractor is limited, due to the additional weight of the extra set of moldboards and in many cases the tractive power of the tractor is wasted for the reason described above.

SUMMARY OF THE INVENTION

With the intention of combining the advantages of a plow with a single set of moldboards and to avoid said disadvantages, a reversible bidirectional moldboard plow has been invented which constitutes an improvement by virtue of which it has the characteristic of turning of the frame and a bidirectional functioning and also has the advantages of the plow with right and left moldboards, which provide a straight cut without limitations of the cutting width.

The reversible bidirectional moldboard plow makes it possible to form a plow with a single set of moldboards and consequently there is a reduction of weight, an increase in the stability of the tractor and better use of the power of the tractor, thus obtaining a greater productivity of the plow.

The bidirectional moldboards are fastened to a support and the latter in turn to a frame bolted and joined to a hitching frame.

This plow with bidirectional moldboards, which constitutes an improvement over prior plows, has the further advantage of being able to cut on the right and left with the same moldboard.

With this bidirectional moldboard a plow can be made with one or more moldboards that can be hitched to a tractor totally with three-point hitch, or can be drawn by a tractor drawbar; further the moldboards can be made for various widths of cut, speeds or soil texture.

When the moldboard is moved under the soil, it will cut a strip of land which by the curved, tilted arrangement of the moldboard will be turned and broken up, making it possible to incorporate harvest remains, exposing pests and weeds to the weather, leaving a preparation for the soil to retain water.

The moldboard will wear out from continuous use and will have to be replaced; however, the moldboard can break or crack prematurely from encountering obstacles on the ground: therefore to reduce breaks or crack in the moldboard a release mechanism can be provided to permit the plow to pass over the obstacles and the plow being able to be reinstalled automatically or manually to come back to enter the earth. Still there can be failures in the moldboard due to the forces that the moldboard encounters when it is forced to be released.

Therefore, an object of the invention is to provide a moldboard plow that makes it possible to use to the utmost the power of the tractor without its stability being lost and which can be made with simple materials.

The moldboard is made up of a frame welded to sheet metal bent in a curved shape, with the cutting edge at the bottom and points at the ends and a pair of supports in the back part to fasten it to the rod of the frame; also a pair of welded supports to compensate for the lateral force at each end. Also it can be made in individually replaceable segments.

The moldboard can be made for different cutting widths, speeds and types of earth.

The moldboard frame and the bidirectional moldboard have as a main characteristic that of forming a reversible plow with a single set of bidirectional moldboards which makes it possible to cut on the right side and left side with the same moldboard, by turning the moldboard frame by a reversing mechanism and to use an adjustable tilting mechanism to compensate for the depth of the bottom of the furrow from the surface.

The specific characteristics of the plow with a bidirectional moldboard are the following:

1. Reversible plow with a single set of moldboards.
2. Cutting on the right side and left side with the same moldboard.

3. Moldboard reversing mechanism to make possible the change of direction with automatic lock without force.
4. Moldboard with simple curve.
5. Detachable lower segment for straight cut which does not leave the earth without turning it over without limitations of cutting width.
6. Lateral segments detachable at both ends.
7. Protective heel at both ends of the moldboards.
8. Special protective heel at both ends of the last moldboard which performs the functions of the wheel on disk plows.
9. Adjustable tilting mechanism for different depths which makes it possible to compensate for the depth of the bottom of the furrow from the surface in both directions.
10. Moldboard frame with bolted side members.
11. Moldboard support of square steel bar.
12. Welded hitching frame.

BRIEF DESCRIPTION OF THE DRAWINGS

For a better understanding of the invention, reference is made to the accompanying sheets of drawings in which.

DESCRIPTION OF THE PREFERRED EMBODIMENT

Figure 1:
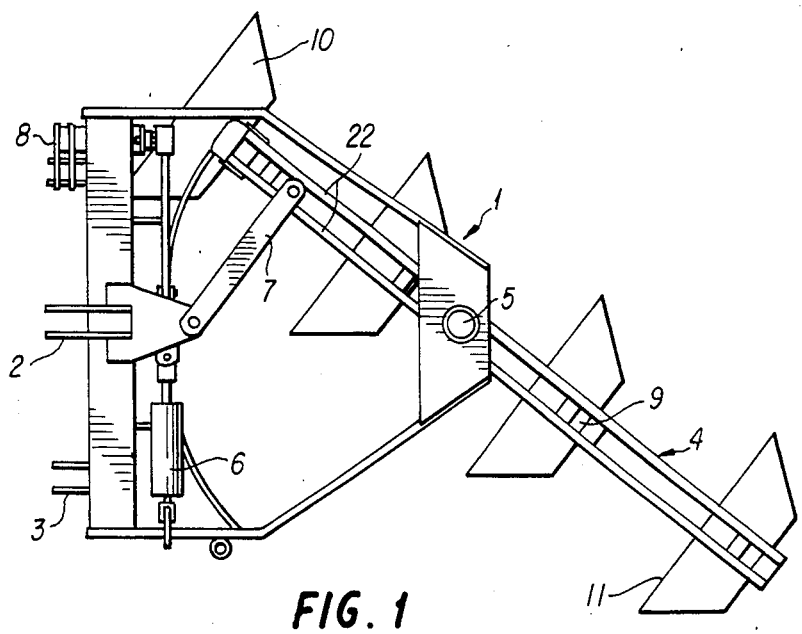
FIG. 1 is a plan view of the moldboard plow, in which the plow is shown with a single set of bidirectional moldboards.

As can be seen in the sheets of drawings, the moldboard plow with a single set of bidirectional moldboards is made up of a hitching frame 1 that has a central pole 2 and hitching plates 3 where the plow is connected to the tractor (not shown).

The plow also has a moldboard frame 4 which is joined to hitching frame 1 by means of a pivot pin 5 which serves to mechanize the reversal of the plow and make bidirectional shares 10 and 11 cut on the right side and left side. Frame 4 includes parallel guides 22,22 extending along the longitudinal axis thereof.

A reversing mechanism 20 of the moldboard plow is operated by mechanical or hydraulic element 6 that moves reversing arm 7 having a pin member 24 which is positioned within guides 22,22 to make frame 4 of the bidirectional moldboards travel to the right side and to the left side of the plow so that bidirectional shares 10 and 11 will cut on each side.

The bidirectional moldboard plow has an adjustable tilting mechanism 8 which is also operated by mechanical or hydraulic element 6 which serves to attain different cutting depths of the plow and which makes it possible to compensate for the depth of the furrow from the surface and to obtain a uniform cutting depth in both directions.

Figure 2:
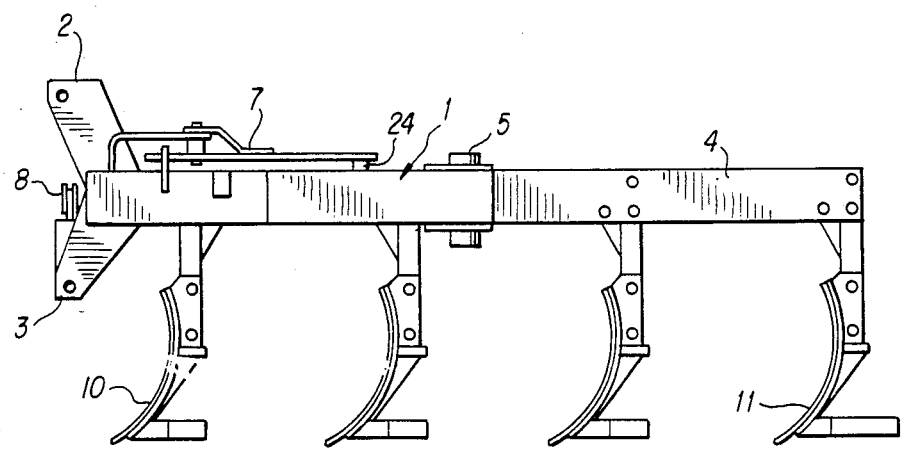
FIG. 2 is a side view of the bidirectional moldboard plow, which is illustrated in FIG. 1 and in which are shown in greater detail the bidirectional moldboards, as well as the support of the moldboards, the moldboard frame and the hitching frame.

Support 9 of the moldboards which is illustrated in FIGS. 1 and 2 serves to fasten bidirectional shares 10 and 11 to moldboard frame 4 to form a bolted unit that pivots on hitching frame 1.

Figure 3:
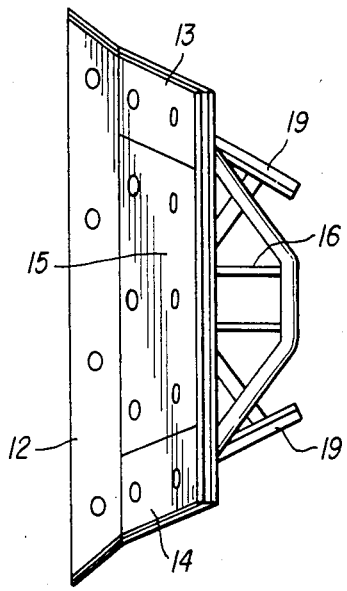
FIG. 3 is a plan view of the bidirectional moldboard which shows the supports and segments of the moldboard.
Figure 4:
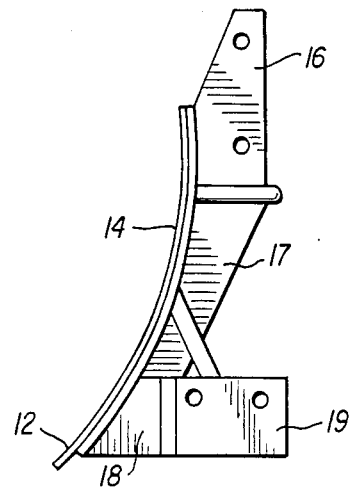
FIG. 4 is a side view of the bidirectional moldboard which is illustrated in FIG. 3 and which shows the parts of the moldboard in greater detail.

In the preferred embodiment of the bidirectional moldboards illustrated in FIGS. 3 and 4, the curved surface is formed by individually replaceable wear segments 12, 13, 14 and 15. Likewise this moldboard is placed at a suitable angle with respect to the drawing line to cut the soil and to make the loosened soil slide, breaking it up and turning it over in a suitable proportion. The surface of the moldboard has a curve to work the earth with a continuous radius except in the area of lower cutting segment 12.

During the plowing operation, the sharp-pointed section of lower cutting segment 12 will make the first contact with the soil causing suction, when the moldboard penetrates into the soil, a loosened furrow will be cut, and as the moldboard advances the cut earth will be lifted and flow across curved sections 13, 14 and 15 at a uniform speed, therefore the earth will begin to be parted or cut into blocks when turned over by the curved surface used to work the earth.

Bidirectional moldboards 10 and 11 have as additional components a support body 16 where the moldboard is fastened to moldboard support 9; it further has a curved base 17 that serves for joining of detachable wear segments 12, 13, 14 and 15. The bidirectional moldboard is also made up of two members 18 located on the ends of the moldboard, each of which supports protective heel 19 which in the case of the last bidirectional moldboard 11 is used to stabilize the moldboard plow, performing the same function as a wheel on disk plows.

What is claimed as new and desired to be secured by Letters Patent of the United States is:

1. A bidirectional moldboard plow, comprising:
   a hitching frame which includes a central pole and a plurality of hitching plates attached thereto;
   a moldboard frame which includes a guide member extending along and permanently parallel with the longitudinal axis of said moldboard frame and a set of bidirectional moldboards fastened to said moldboard frame and extending along said axis, said moldboard frame being fastened to the hitching frame by a pivot pin for reversible pivoting of the moldboard frame such that said bidirectional moldboards are adapted to cut into the soil on a right and left side of said plow; and
   reversing means connected to said guide member of said moldboard frame, said guide member guiding a portion of said reversing means along said longitudinal axis for moving said moldboard frame and said set of bidirectional moldboards by a pivoting action to said right side and said left side of the plow.

2. A moldboard plow as claimed in claim 1, wherein said reversing means is connected to said central pole.

3. A moldboard plow as claimed in claim 1, wherein said moldboard each comprise a moldboard support connected to said moldboard frame and a bidirectional moldboard connected to said moldboard support.

* * * * *